(12) United States Patent
Balasubramanian et al.

(10) Patent No.: US 11,400,894 B2
(45) Date of Patent: Aug. 2, 2022

(54) DYNAMIC CONTROL OF AIRCRAFT WINDSCREEN WIPER AND WASH SYSTEM CONFIGURATION PARAMETERS

(71) Applicant: ROSEMOUNT AEROSPACE INC., Burnsville, MN (US)

(72) Inventors: Rameshkumar Balasubramanian, Karnataka (IN); Venkatesan Muthulingam, Karnataka (IN); Skanda Gopalakrishna, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 456 days.

(21) Appl. No.: 16/535,134

(22) Filed: Aug. 8, 2019

(65) Prior Publication Data

US 2020/0384956 A1    Dec. 10, 2020

(30) Foreign Application Priority Data

Jun. 7, 2019   (IN) .............................. 201911022700

(51) Int. Cl.
| | |
|---|---|
| *B60S 1/08* | (2006.01) |
| *B60S 1/48* | (2006.01) |
| *B64F 5/30* | (2017.01) |
| *B60S 1/52* | (2006.01) |

(52) U.S. Cl.
CPC ................. *B60S 1/486* (2013.01); *B60S 1/08* (2013.01); *B60S 1/52* (2013.01); *B64F 5/30* (2017.01); *B60S 1/48* (2013.01)

(58) Field of Classification Search
CPC ................. B60S 1/08; B60S 1/48; B60S 1/52
See application file for complete search history.

(56) References Cited

U.S. PATENT DOCUMENTS

| 8,843,270 B2 | 9/2014 | Kwon et al. | |
|---|---|---|---|
| 10,259,430 B2 | 4/2019 | Tousignant et al. | |
| 2009/0282636 A1* | 11/2009 | Braun ....................... | B60S 1/08 318/444 |

(Continued)

FOREIGN PATENT DOCUMENTS

CN    108058675 A    5/2018

OTHER PUBLICATIONS

European Search Report; European Application No. 19212736.3; Application Filed: Nov. 29, 2019; Search Report dated Jun. 30, 2020; 9 pages.

*Primary Examiner* — Michael D Jennings
(74) *Attorney, Agent, or Firm* — Cantor Colburn LLP

(57) ABSTRACT

Provided are embodiments for a system having an avionics system that is configured to dynamically communicate one or more configurable parameters of a wiper and wash system based at least in part on a selected mode, and an avionics bus that is configured to communicate dynamic parameters from the avionics system. The system also includes a wash system having a fluid reservoir and fluid level sensor, and a wiper system including a control unit (ECU) that is configured to operate the system based at least in part on the one or more configurable parameters, wherein the wiper system is coupled to the wash system and supplies the wash fluid to the wiper system. Also provided are embodiments of a method for performing dynamic control of the aircraft windscreen wiper and wash system configuration parameters.

9 Claims, 12 Drawing Sheets

100

(56) References Cited

U.S. PATENT DOCUMENTS

2016/0347287 A1* 12/2016 Tousignant ............... B60S 1/52
2017/0305392 A1    10/2017 Lee
2019/0061696 A1     2/2019 Vadgaonkar et al.
2021/0024037 A1*  1/2021 Salter ................... B60S 1/0818

* cited by examiner

DYNAMIC CONTROL OF AIRCRAFT WINDSCREEN WIPER AND WASH SYSTEM CONFIGURATION PARAMETERS

CROSS-REFERENCE TO RELATED APPLICATIONS

This application claims the benefit of Indian Application No. 201911022700 filed Jun. 7, 2019, which is incorporated herein by reference in its entirety

BACKGROUND

The present invention relates to wiper and wash system, and more specifically to the dynamic control of the aircraft windscreen wiper and wash system configuration parameters.

Windscreen wiper and wash systems are used to clean and remove the debris from the windscreen attached to the system. These systems are equipped on different types of vehicles including aircraft, automobiles, and marine vehicles. The size and operation of the windscreen wiper and wash systems can vary depending on its application. The operation of the windscreen wiper and wash system are controlled by an operator. For example, the speed of the wiper system and the number of wash cycles can be provided under the control of the operator.

BRIEF DESCRIPTION

According to an embodiment, a system is provided that includes an avionics system that is configured to dynamically communicate one or more configurable parameters of a wiper and wash system based at least in part on a selected mode and an avionics bus that is configured to communicate dynamic parameters from the avionics system. The system also includes a wash system having a fluid reservoir and fluid level sensor, and a wiper system including a control unit (ECU) that is configured to operate the system based at least in part on the one or more configurable parameters, wherein the wiper system is coupled to the wash system and supplies the wash fluid to the wiper system.

In addition to one or more of the features described herein, or as an alternative, further embodiments include using one or more configurable parameters such as a wiper speed, a sweep angle, and a sweep area.

In addition to one or more of the features described herein, or as an alternative, further embodiments include a wiper system bus having an electrical bus that couples the wash system to the wiper system and a wash tube to supply the wash fluid to the wiper system.

In addition to one or more of the features described herein, or as an alternative, further embodiments include a wiper interface device that is configured to interface the wiper system and the wash system coupled to the wiper system bus with the avionics bus.

In addition to one or more of the features described herein, or as an alternative, further embodiments include a wash system and wiper system that are directly connected to the avionics bus.

In addition to one or more of the features described herein, or as an alternative, further embodiments include a wiper system having a first wiper system having a first ECU and a second wiper system having a second ECU, wherein the first and second wiper system are configured to monitor the avionics bus for the dynamic parameters and control the wiper system based on the parameters.

In addition to one or more of the features described herein, or as an alternative, further embodiments include a first ECU and a second ECU configured to communicate to synchronize the operation of the first wiper system and the second wiper system.

In addition to one or more of the features described herein, or as an alternative, further embodiments include operating in an automatic mode which operates the wiper system and wash system based at least in part on an avionics input.

In addition to one or more of the features described herein, or as an alternative, further embodiments include using avionics input parameters such as air speed of a vehicle or an angle of attack, wherein the avionics system comprises one or more sensors to obtain the avionics input.

According to another embodiment, a method for performing dynamic control of the aircraft windscreen wiper and wash system configuration parameters is provided. The method includes selecting a mode of operation for a wiper and wash system, wherein the mode of operation is one of a dual mode, an independent mode, or an automatic mode, and receiving one or more configurable parameters of a wiper and wash system. The method also includes monitoring feedback from one or more sensors, and controlling the wiper and wash system based at least in part on the one or more configurable parameters, the monitored feedback, and the selected mode.

In addition to one or more of the features described herein, or as an alternative, further embodiments include using one or more configurable parameters such as a wiper speed, a sweep angle, and a sweep area.

In addition to one or more of the features described herein, or as an alternative, further embodiments include controlling the wiper system includes controlling a first wiper system and a second wiper system based on the one or more parameters, and input from an avionics bus.

In addition to one or more of the features described herein, or as an alternative, further embodiments include operating in a dual mode, where the operation of the first wiper system and the second wiper system are operated synchronously.

In addition to one or more of the features described herein, or as an alternative, further embodiments include operating in an independent mode, where the operation of the first wiper system and the second wiper system are operated independently.

In addition to one or more of the features described herein, or as an alternative, further embodiments include operating in an automatic mode, where the operation of the wiper and wash system is based at least in part on an avionics input.

In addition to one or more of the features described herein, or as an alternative, further embodiments include using avionics input parameters such as air speed of a vehicle or an angle of attack, wherein the avionics system includes one or more sensors to obtain the avionics input.

In addition to one or more of the features described herein, or as an alternative, further embodiments include exchanging data, by a wiper interface device, between the wiper system bus and an avionics bus.

In addition to one or more of the features described herein, or as an alternative, further embodiments include exchanging data between the wiper and wash system and an avionics bus to control the wiper and wash system.

In addition to one or more of the features described herein, or as an alternative, further embodiments include checking a wash fluid level, and providing an alert based on comparing the wash fluid level to a wash fluid level threshold.

Technical effects of embodiments of the present disclosure include a system and method to dynamically control the wiper system and wash system. In addition, the technical effects allow the avionics systems to dynamically update/change the wiper system and wash system parameters. The technical effects include a wiper interface device to interface the windscreen wiper system and wash system to the avionics bus.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Traditional wiper systems were predominantly designed as mechanical systems which offered very limited or no reuse opportunities across various platforms. That is, wiper systems are custom designed to fit the needs of each individual platform thus, resulting in high engineering development costs and more parts to manage during the manufacturing and assembling stage. The existing solutions are not able to be dynamically updated during operation.

In an effort to reduce the development cost and to improve the reusability and expandability, the wiper systems are designed with configurable parameters which are customized based on the platform needs. In this approach, a comprehensive wiper system is developed and is customized by altering the configurable parameters. The configurable parameters include but are not limited to wiping speed, sweep angle, sweep area, etc.

Figure 1:
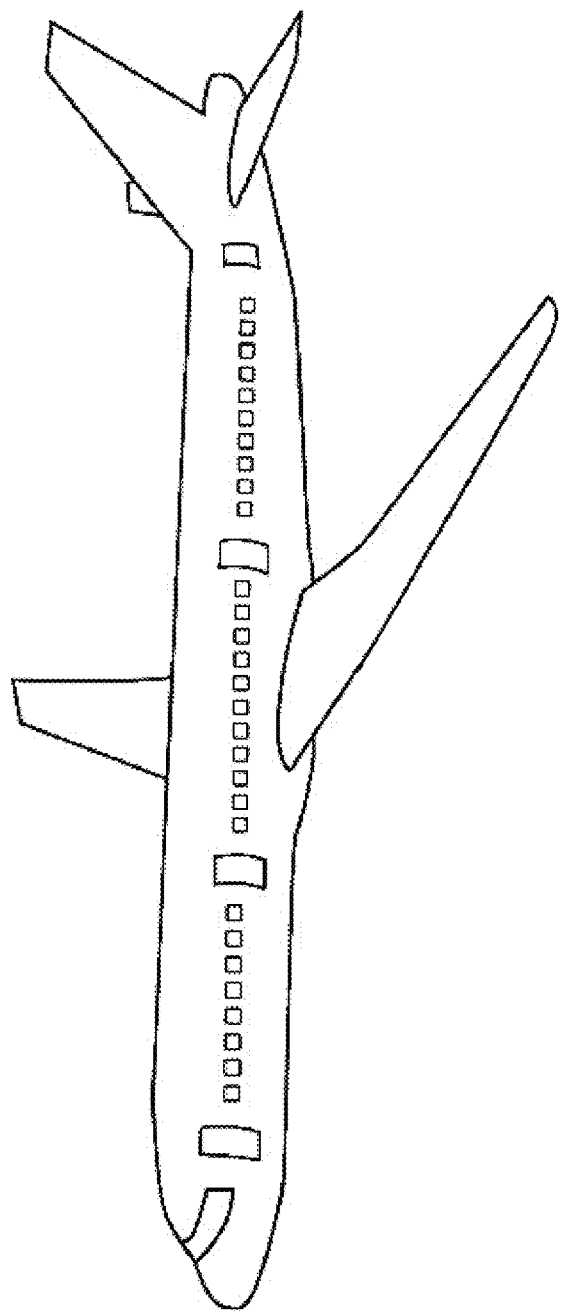
FIG. 1 depicts an aircraft that implements the system described herein.

Referring now to FIG. 1, an aircraft 100 is shown that can implement the systems described herein. It should be understood the wiper system and wash system can be implemented on other types of vehicles not limited to trains, boats, and other vehicles.

Figure 2:
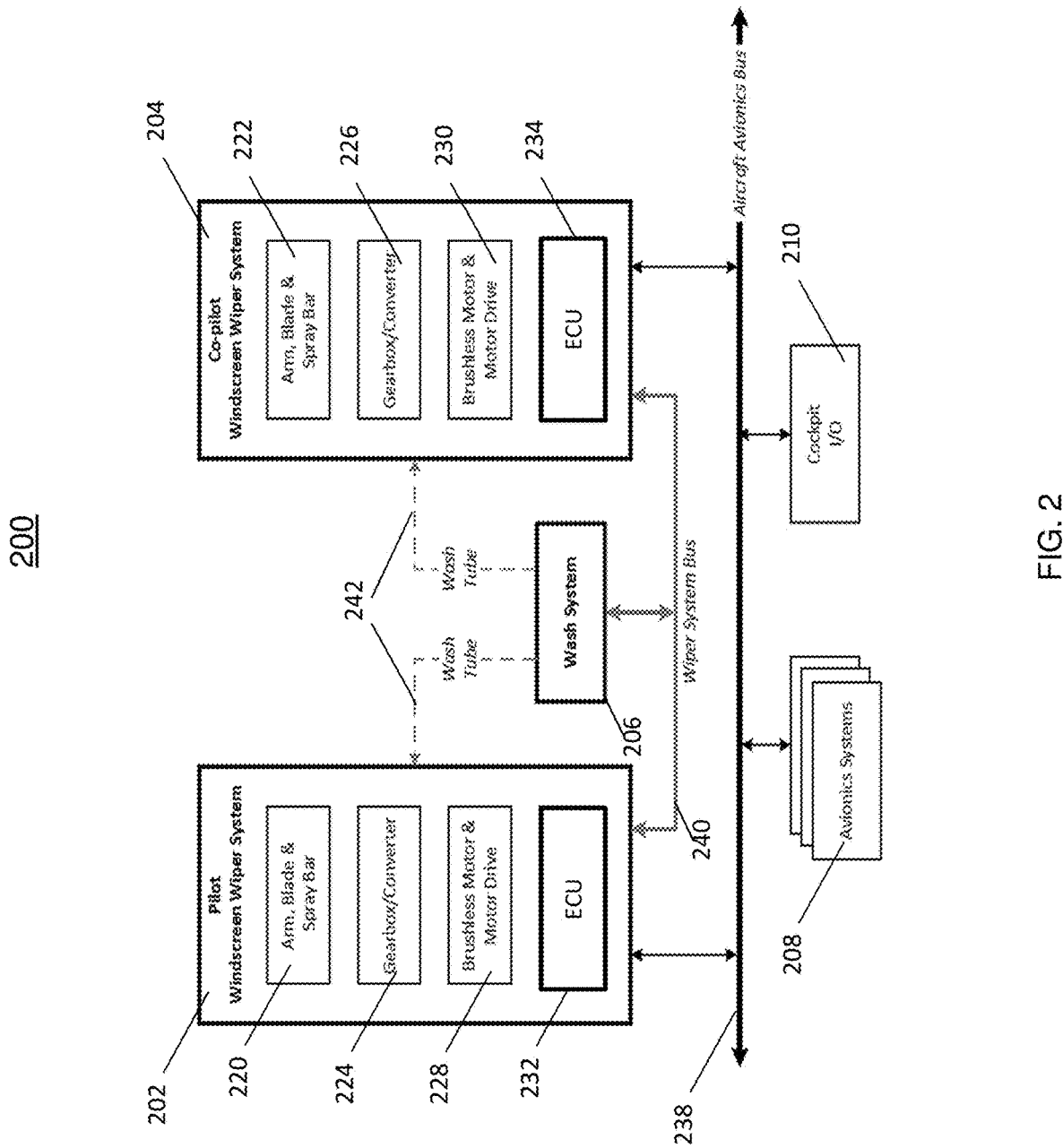
FIG. 2 depicts a system in accordance with one or more embodiments.

FIG. 2 depicts a high-level architecture of the system 200 including the wiper system and wash system described herein. The system 200 includes a pilot wiper system 202 and a co-pilot wiper system 204. Each of the wiper systems 202, 204 include an arm, blade and spray bar 220, 222; gearbox/converter 224, 226, brushless motor and motor drive 228, 230; and an electronic control unit 232, 234.

In addition, the system 200 also includes a wash system 206. The wash system 206 includes a wash tank and a wash fluid level sensor 310 (shown in FIG. 3). The wash tank stores the wash fluid used when the wiper system is activated and is provided to the spray 220, 222 through the wash tubes 242. The level of the wash fluid in the wash tank is sensed using the fluid level sensor 310 installed in the wash tank. In the event a low fluid level or below predefined threshold in the wash tank is detected, a fault can be reported to the wiper systems to the activation of the wiper system. The wiper system can further transmit the fault to the cockpit to alert the operators.

System 200 includes avionics systems 208 and communicate with the pilot and co-pilot wiper systems via the aircraft avionics bus 238. The avionics systems 208 address both wiper systems independently using their assigned unique addresses. In addition, the avionics systems 208 implement logic to dynamically communicate and configure the wiper parameters (wiper speed, sweep angle, sweep area, wash control, wiper control, etc.) to the pilot and co-pilot wiper systems only if the wiper mode selection in the cockpit is set to the AUTO mode. If the wiper mode selection in the cockpit is set to INDEPENDENT or DUAL modes then the dynamic parameters are ignored by the wiper systems. The avionics systems 208 are also configured to retrieve the maintenance fault logs from the fault log repository in the wiper system. The avionics system 208 can also monitor the wiper and wash systems status.

The system 200 also includes a cockpit I/O 210 which is configured to receive faults that may be encountered in the wiper system and the low level wash fluid status. The cockpit I/O 210 also provides cockpit input to the wiper and wash systems such as setting the operational mode, wiping speed, washing operation, etc.

The aircraft avionics communication bus 238 can include wired communication interface such as ARINC 429, CAN, Ethernet, RS422/RS232, etc. or a wireless communication interface such as Bluetooth, Wi-Fi, wireless avionics intra-communication (WAIC), etc.

As shown the pilot wiper system 202, co-pilot wiper system 204 and the common wash system 206 are interconnected by a dedicated wiper system bus 240 to exchange data like wash fluid level status, faults, wash control, etc. between the systems without any intervention from other systems. In one or more embodiments, the wiper system bus 240 can include a wired communication interface such as ARINC 429, CAN, RS422/RS232, etc. or a wireless communication interface such as Bluetooth, Wi-Fi, wireless avionics intra-communication (WAIC), etc.

Figure 3:
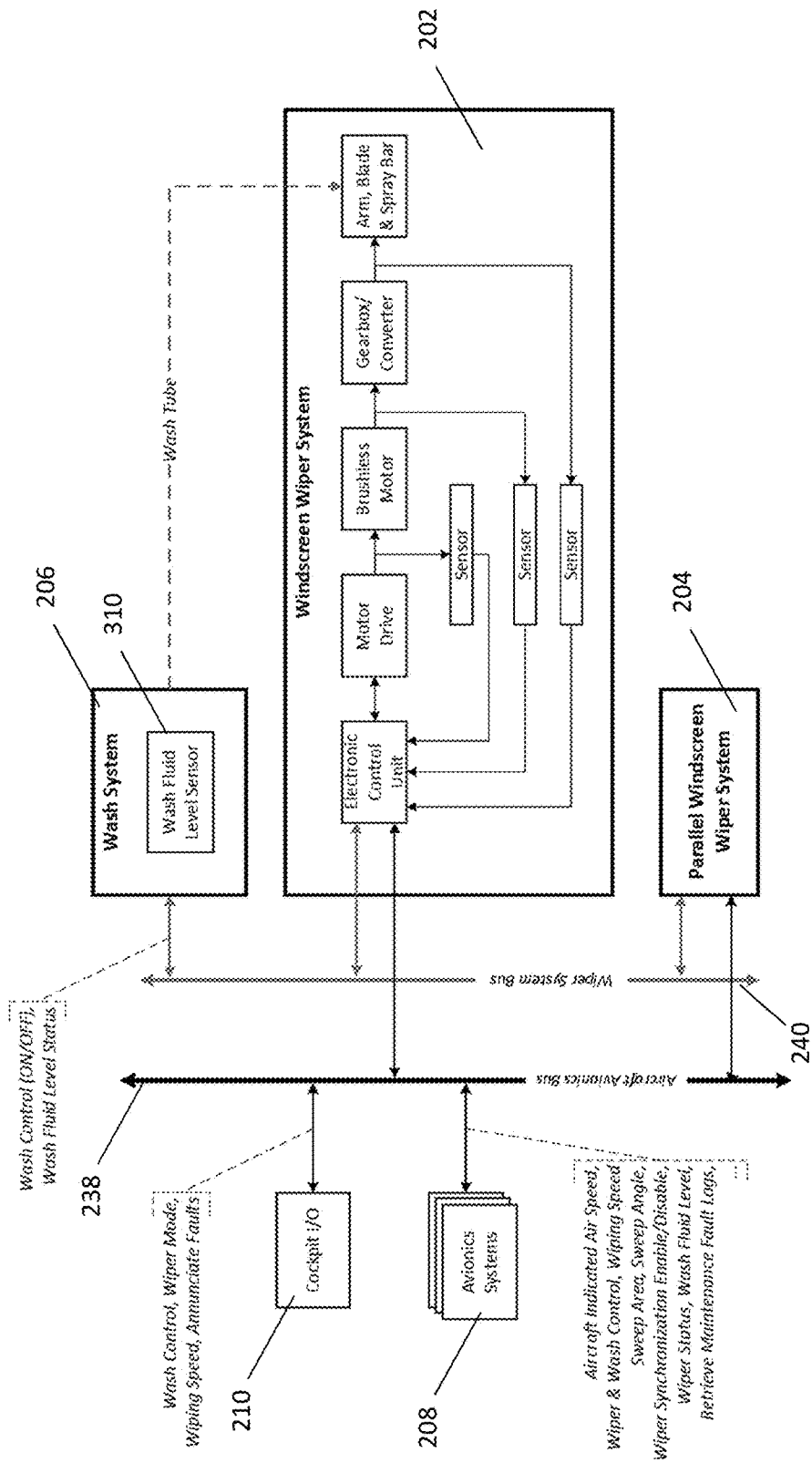
FIG. 3 depicts a detailed architecture of the wiper systems and wash system in accordance with one or more embodiments.

FIG. 3 depicts a detailed architecture of the wiper system and wash system in accordance with one or more embodiments. As shown, the wiper system 300 includes multiple components in addition to those described with respect to FIG. 2. The wiper systems 202, 204 include a plurality of sensors. For example, a first sensor is coupled to the output of the motor drive and the ECU, a second sensor is coupled to the output of the brushless motor and the ECU, and a third sensor is coupled to the output of the gearbox/converter and the ECU. It should be understood that additional sensors can be coupled to the ECU and other components of the ECU to detect the proper operation of the wiper system. These sensors include current sensors, speed sensors, and position sensors.

Figure 4:
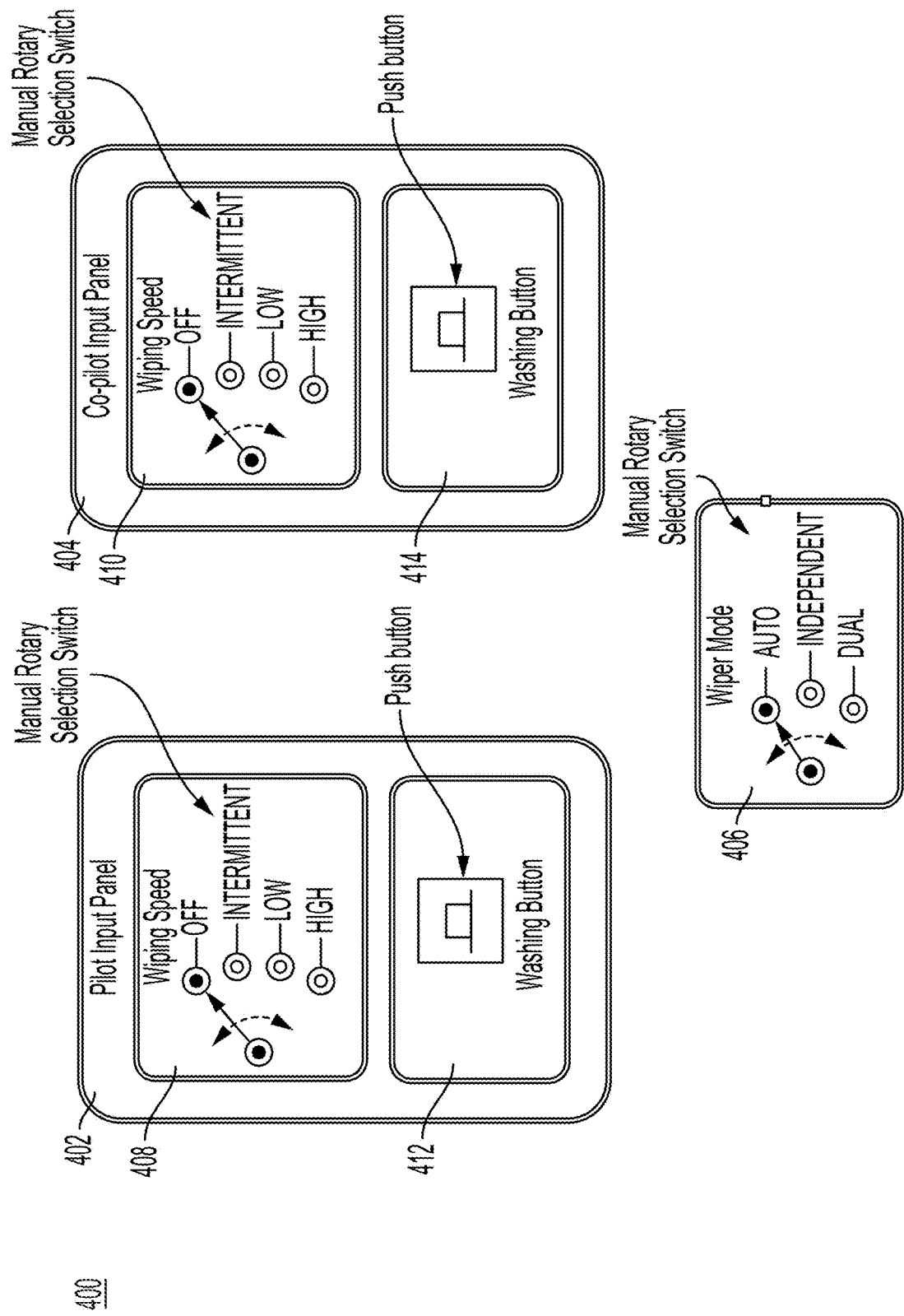
FIG. 4 depicts an illustration of a manual rotary switch used for cockpit input.

FIG. 4 depicts an illustration of a manual rotary switch used for cockpit I/O system 400. In one or more embodiments, the cockpit I/O system 400 can be coupled to the system 200 as the cockpit I/O 210 of FIG. 2. As shown, the cockpit I/O system 400 includes a pilot input panel 402, a co-pilot input panel 404, and a wiper mode setting 406. The wiping speed can be selected from the switches 408, 410 and the washing system button 412, 414 can be selected by the operator to activate the wash system.

The wiper mode of operation can be selected through a selection switch in the cockpit in the wiper mode setting panel 406. The wiper modes of operation can include an INDEPENDENT mode, a DUAL mode, and an AUTO (automatic) mode. In an INDEPENDENT mode, the pilot and co-pilot wiper systems are independently controlled. In the DUAL mode, the pilot and co-pilot wiper systems are controlled together such that the wiper blades of both the pilot and co-pilot wiper systems are synchronized so that no distractions that result to the pilot or co-pilot. In AUTO mode, the configurable parameters of the wiper system such as the wiper speed, sweep area, sweep angle, wash control, etc. are dynamically updated/changed based on the avionics system inputs through the aircraft avionics bus.

When operating in the INDEPENDENT mode, the pilot and co-pilot wiper systems are independently controlled and selected by the user in the cockpit. Responsive to the selection, the wiping operation is performed based on the wiping speed (Off, Low, Intermittent, and High) selected in the cockpit. The wiping speed selection input is mapped to the predefined wiper system configuration to arrive at the wiping speed for the wiper function. The wash system can be activated by pressing the washing button by either the pilot or co-pilot in the cockpit. The washing function checks for the wiping speed. If the wiping speed of both the pilot and co-pilot are set to the Off position, then the washing function is switched Off. Alternatively, if the wiping speed of either the pilot or co-pilot is set to Low, Intermittent, or High position, the washing is performed.

If the wash fluid level is lower than the configurable threshold level, the washing function can be disabled and the low level wash fluid fault is annunciated to the cockpit by the wiper system. If enough wash fluid exists in the wash tank of the wash system, the wash fluid is sprayed on both the pilot and co-pilot windscreens. In one or more embodiments, the wash fluid level status can be reported to the wiper system and further reported to another system to inform the pilot and co-pilot.

When operating in the DUAL mode, the wiping speeds of both the pilot and co-pilot wiper systems are synchronized. The wiper system follows the wiping speed of the parallel wiper system, if the parallel wiper system is active. In the event the parallel wiper system is not active then the wiper system continues to drive at the wiping speed as defined in the predefined wiper system configuration. If the washing button is pressed by either the pilot or co-pilot in the cockpit, the washing function is then activated.

The washing function checks for the wiping speed. If the wiping speed of both the pilot and co-pilot are Off then the washing function is switched Off. Alternatively, if the wiping speed of either the pilot or co-pilot is set to the Low, Intermittent, or High position, then the washing function is performed. Similar to the INDEPENDENT mode, the wash fluid level is checked and based on the fluid level, the wash fluid is sprayed on the pilot and co-pilot windscreens or a fault/alert is provided to the wiper system.

When operating in the AUTO mode, the ECU of the wiper systems monitors the avionics bus for the dynamic parameters from the avionics systems 208. The wiping speed selection and washing function selection are ignored by the wiper system. That is, when the AUTO mode is set, the speed and washing function that is set in the pilot and co-pilot systems are not used during operation. The dynamic parameters such as the indicated airspeed of the vehicle or angle of attack or other parameter determines the operation of the wiper speed. Once the parameters are detected, the engineering parameters that require translation/conversion, the wiper system performs the conversion as defined in the stored database. The dynamic wiper parameters are substituted for the wiper configuration that is currently in use in the system.

Responsive to computing the dynamic wiper parameters, the ECU commands the motor drive to operate according to the wiper parameters. The motor drive command is provided to the motor to mechanically drive the wiper externals. In addition, the wiper and wash system status along with fault logs are reported to the appropriate avionics systems.

Figure 5:
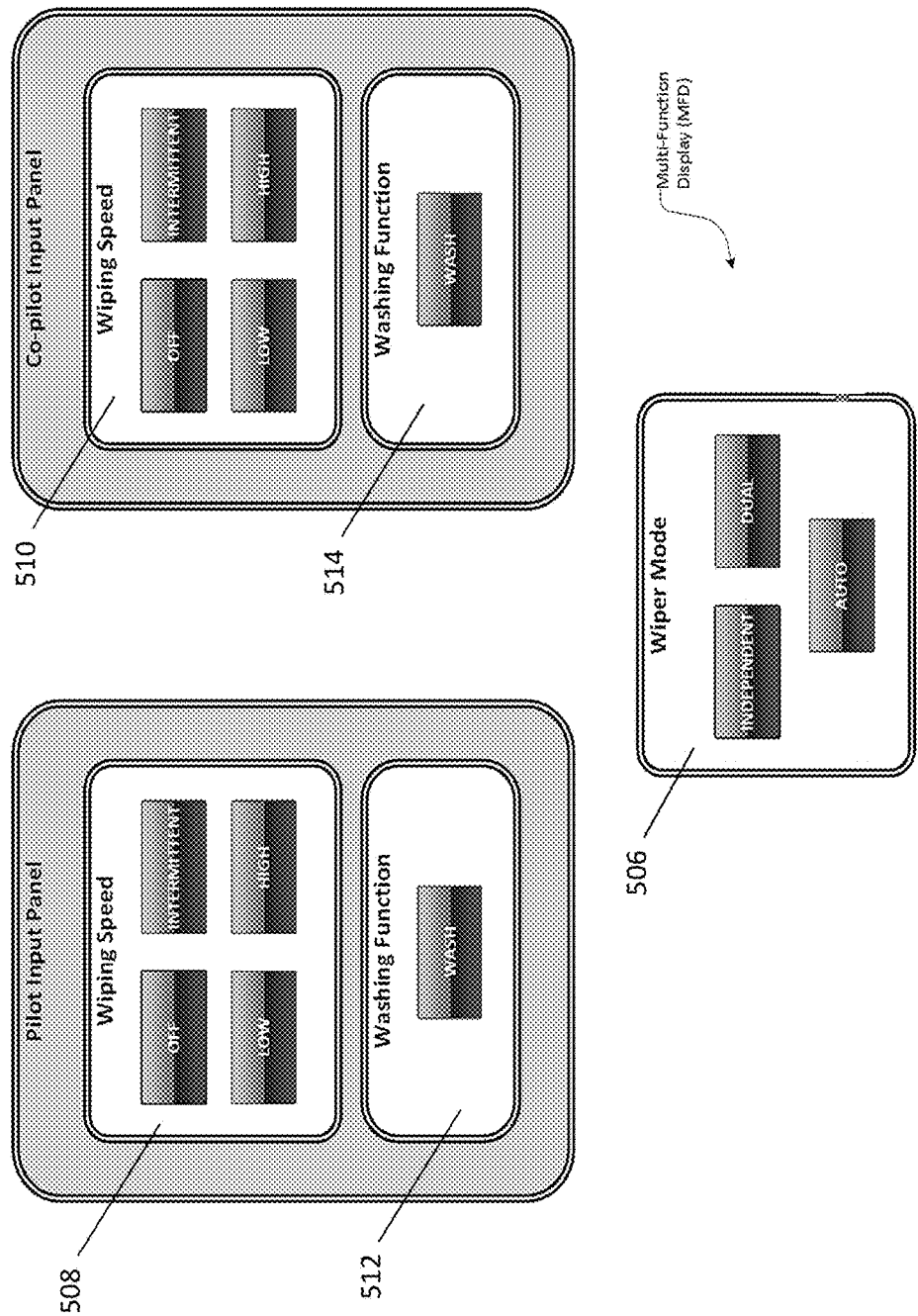
FIG. 5 depicts an illustration of multi-function display used for cockpit input in accordance with one or more embodiments.

FIG. 5 depicts an illustration of multi-function display 500 used for cockpit input in accordance with one or more embodiments. In one or more embodiments, the display 500 can be coupled to the system 200 in the cockpit I/O 210 as shown in FIG. 2. The display 500 provides similar controls to those provided in FIG. 4 including wiping speed controls 508, 510, washing controls 512, 514, and wiper mode controls 506.

Figure 6:
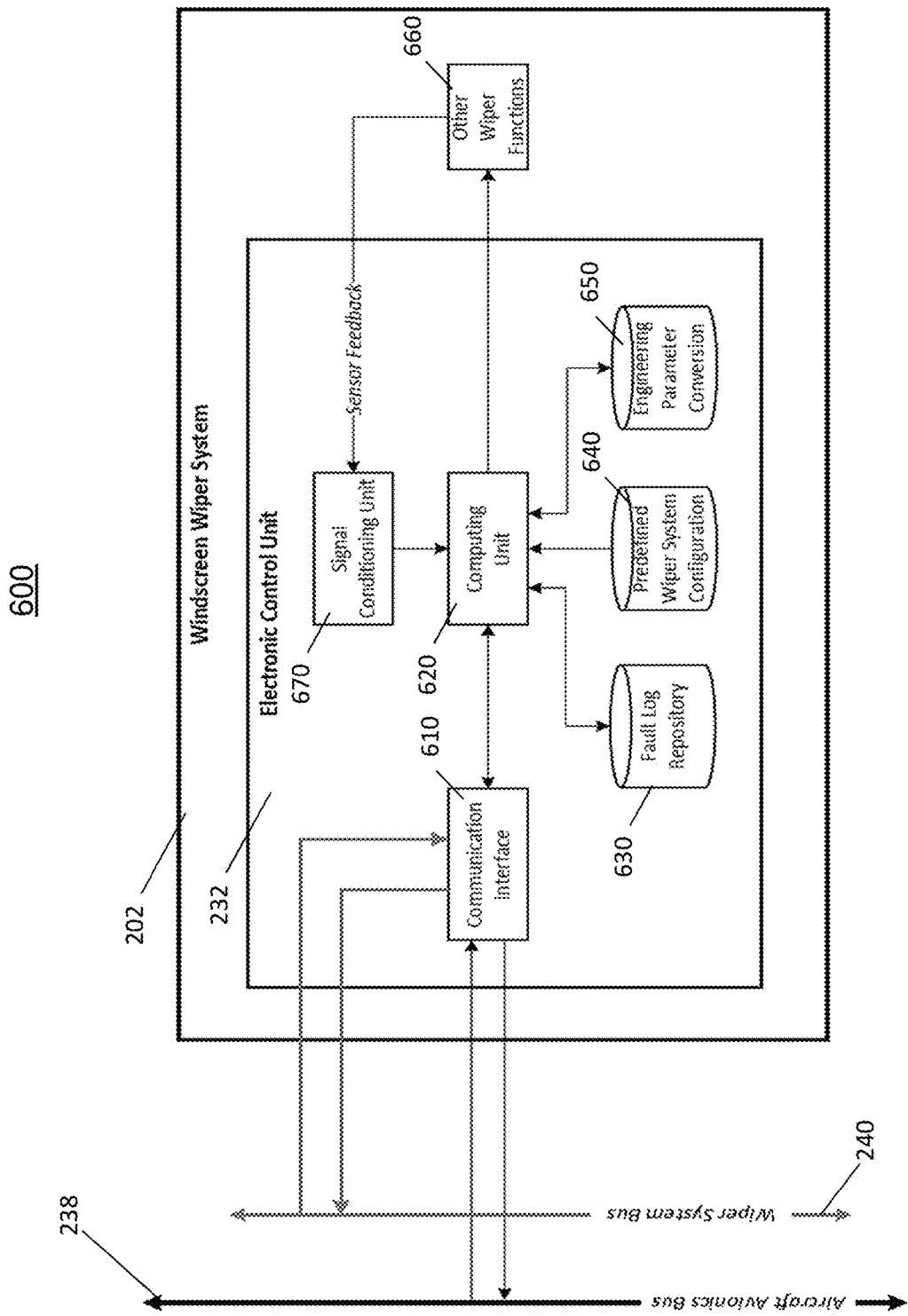
FIG. 6 depicts an ECU of the wiper system in accordance with one or more embodiments.

FIG. 6 depicts an ECU 232 of the wiper system 202 in accordance with one or more embodiments. The ECU 232 is a microprocessor or a microcontroller based computing unit which reads the predefined wiper system configuration from storage 640 and configures the wiper system 202. The ECU 232 monitors the cockpit inputs.

The ECU 232 is configured to communicate with the system 200 through communication interface 610 over the aircraft avionics bus 238 and a wiper system bus 240. The communication interface 610 is coupled to the computing unit 620 which is coupled to the fault log repository 630, the predefined wiper system configuration 640, and the engineering parameter conversion 650. The ECU 232 converts the engineering parameters to wiper parameters through a stored database per the platform configuration. The engineering parameter conversion logic can be a lookup table-based or formula-based or a combination thereof. The output of the computing unit 620 is operated to control the wiper functions 660 including the motor drive and wash system. The sensor feedback from the sensors such as those shown in FIG. 3 are providing to the signal conditioning unit 670 and modifies the commands provided by the computing unit 620.

The motor drive receives a command to appropriately drive the motor. The motor mechanically drives the wiper externals (arm and blade) through the gearbox/converter. Also shown in FIG. 6, the electronic control unit communicates with the parallel wiper system to synchronize the wiper blades when both the pilot and co-pilot wiper systems are operated simultaneously (in DUAL mode of operation).

Figure 7A:
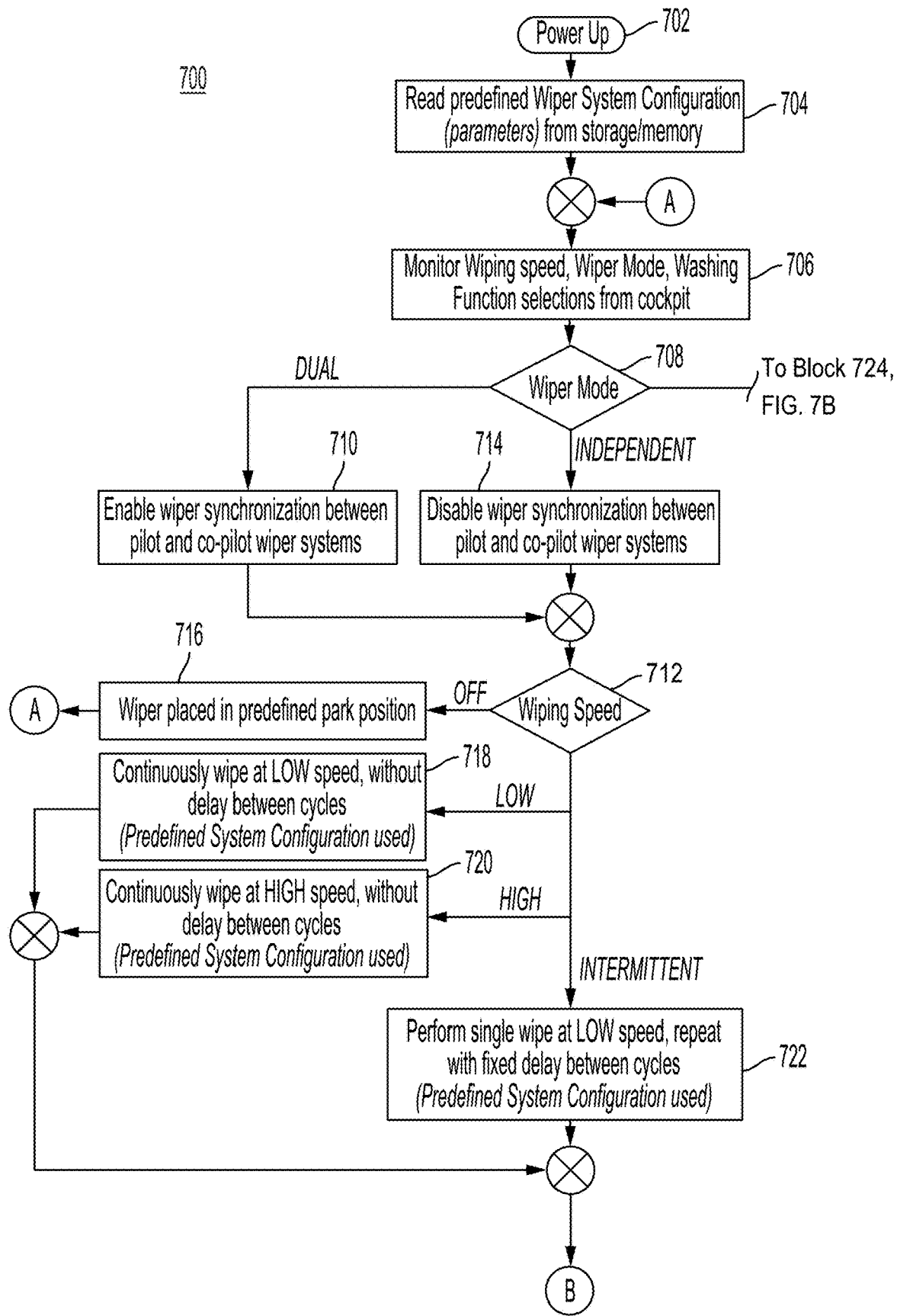
FIG. 7A depicts a flowchart of a method for operating the system in accordance with one or more embodiments.

FIG. 7A depicts a flowchart of a method for operating the system in accordance with one or more embodiments. At block 702, the system is powered up and continues to block 704 where the ECU reads the predefined wiper system configuration parameters from storage/memory. The method 700 proceeds to block 706 and the ECU monitors the wiping speed, wiper mode, washing function selections from the cockpit. At decision block 708, the system determines the current wiper mode of operation. If it is determined the wiper mode is set to the DUAL mode, the method proceeds to block 710 where the wiper synchronization between the pilot and co-pilot wiper systems is enabled. The method 700 proceeds to block 712 and determines the wiper speed.

Returning to block 708, if it is determined that the INDEPENDENT mode is selected, the method 700 proceeds to block 714 and the synchronization between the pilot and co-pilot wiper systems is disabled and continues to block 712.

At block 712, if the wipers are turned Off, the method 700 proceeds to block 716 and ensures the wipers are in the parked position and proceed to the entry point "A" to continue the process. Otherwise, at block 712, the wipers operate at the Low speed as shown in block 718, the wipers operate at a High speed as shown in block 720, and the wipers operate at an Intermittent speed as shown in block 722 the proceeds to entry point "B" shown in FIG. 8A.

Figure 7B:
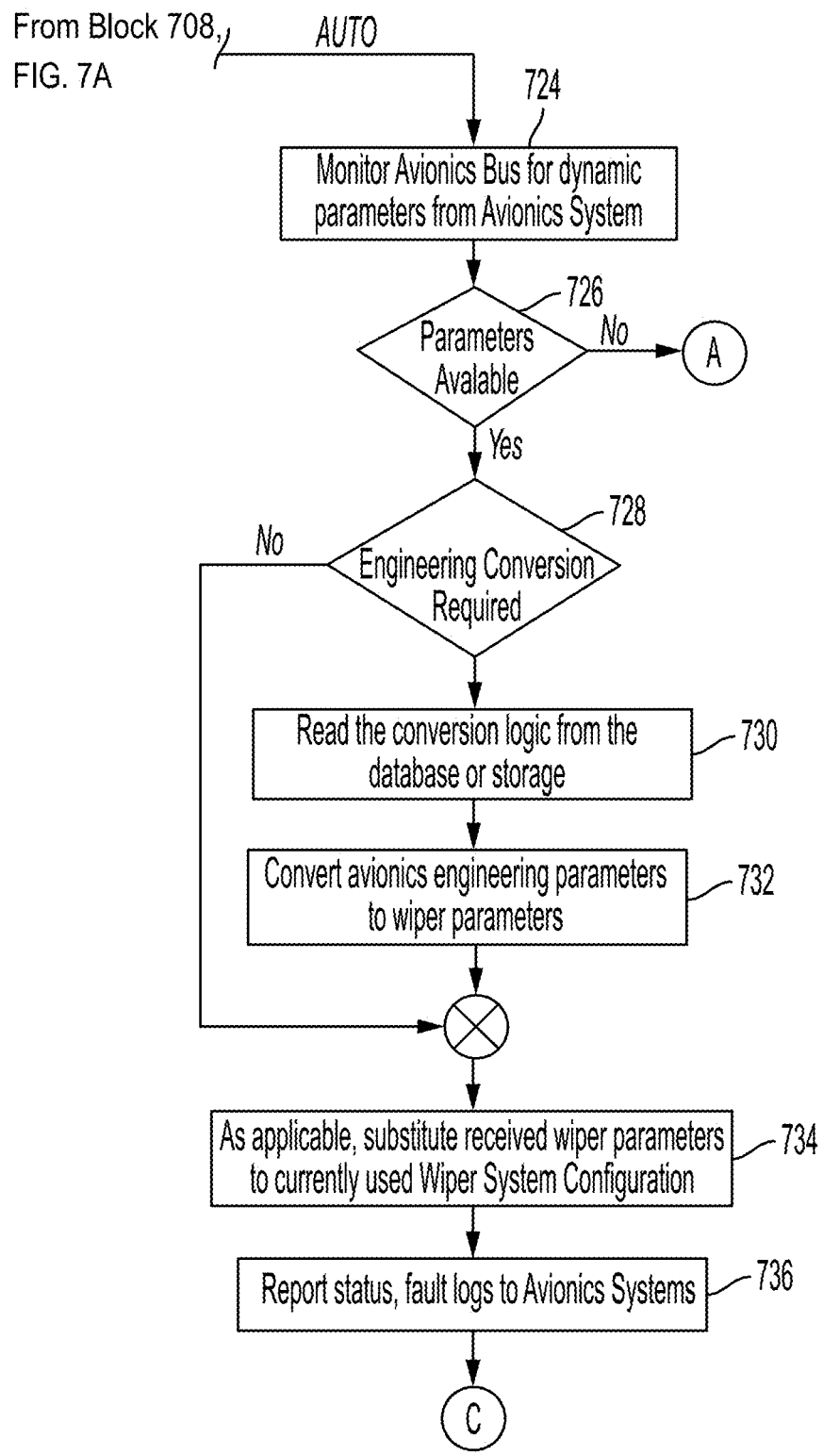
FIG. 7B depicts another flowchart of a method for operating the system in accordance with one or more embodiments.

Returning to block 708, if it is determined that the AUTO mode is detected, the method 700 proceeds to block 724 of FIG. 7B where the ECU is configured to monitor the avionics bus for dynamic parameters from the avionics system. At block 726, if the parameters are unavailable the method 700 returns to entry point "A" of FIG. 7A. If the parameters are available, it is determined at block 728 whether the parameters require conversion. If so, the method 700 proceeds to block 730 where the conversion logic is read from the database or storage. Block 732 converts the parameters to wiper parameters to operate the system. At block 734, if applicable, the received wiper parameters are substituted to the currently used wiper system configuration. Block 736 reports any status or fault logs to the avionics systems and continues to entry point "C" of FIG. 8B.

Figure 8A:
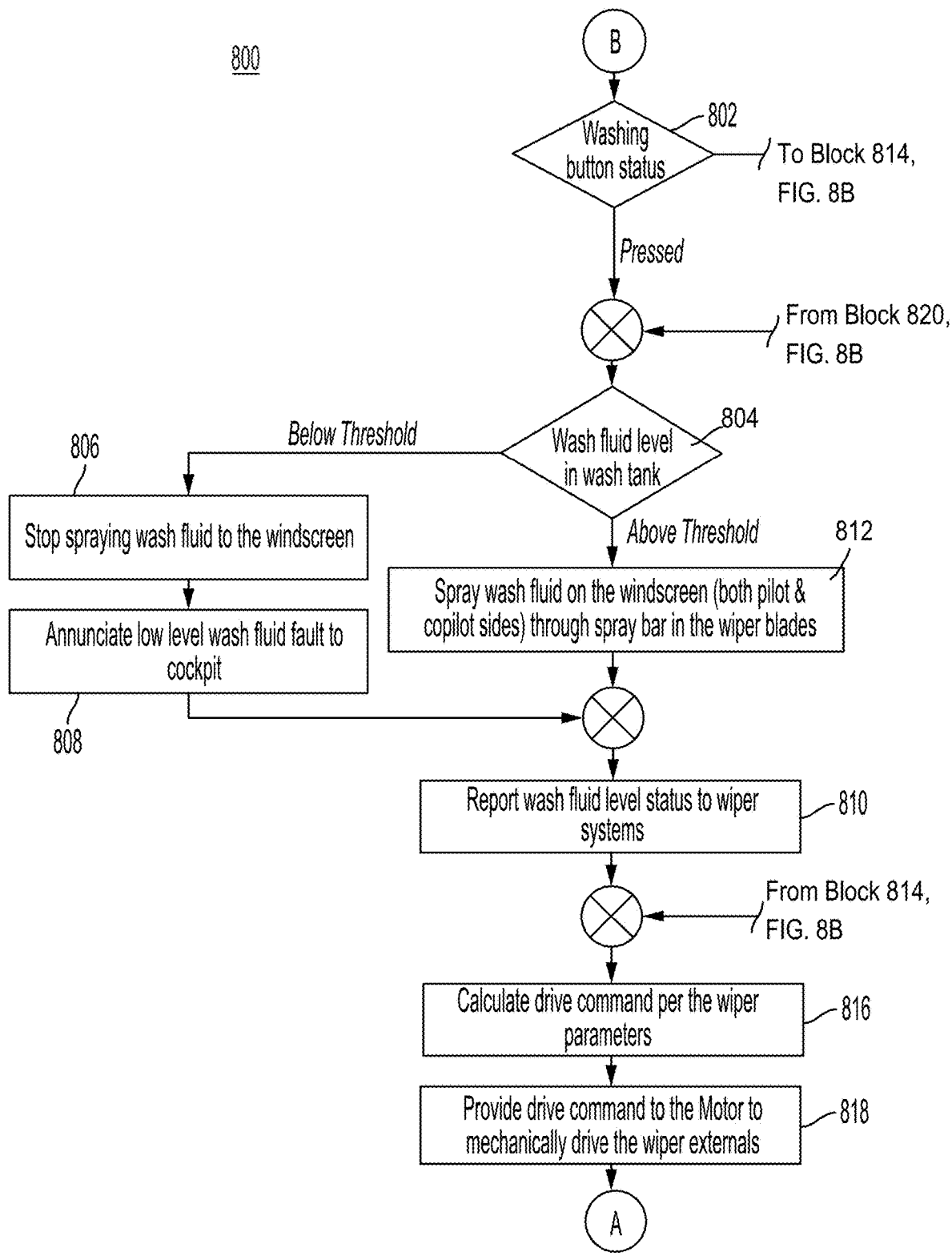
FIG. 8A depicts a flowchart of a method for operating the system in accordance with one or more embodiments.

FIG. 8A depicts a flowchart of a method 800 for operating the system in accordance with one or more embodiments. The method 800 begins at entry point "B" and continues to block 802 to determine the wash button status. If the button is pressed, the method 800 continues to block 804 and the wash fluid level in the wash tank is checked. If the level is below the threshold level, the method 800 proceeds to block 806 and the fluid is prohibited from spraying to the windscreen. At block 808, the low level fault is provided to the cockpit and continues to block 810 to report the fluid level status to the wiper system.

Returning to block 804, if the fluid level is above the threshold level, at block 812 the wash fluid is sprayed on the windscreen through the spray bar of the wiper blades. The method continues to block 810.

Figure 8B:
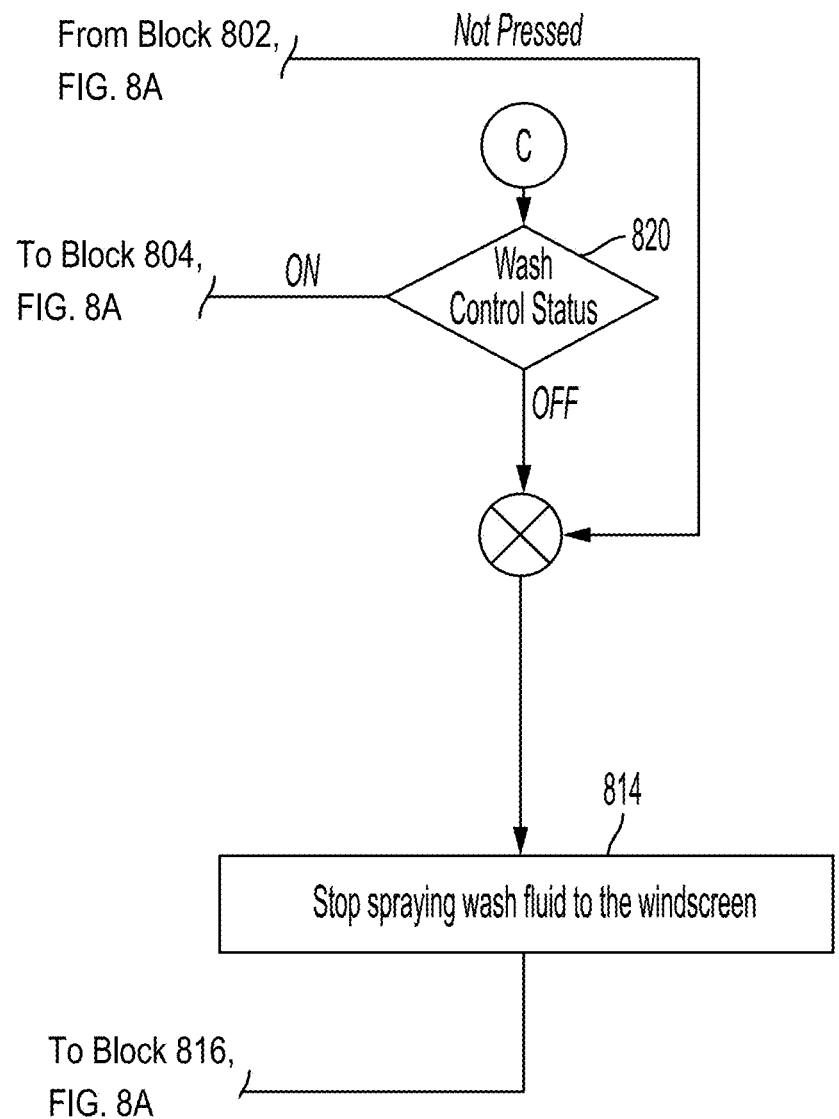
FIG. 8B depicts another flowchart of a method for operating the system in accordance with one or more embodiments.

Returning to block 802, if it is determined the wash button is not pressed the process continues to block 814 of FIG. 8B and the wash fluid is stopped from being applied to the windscreen.

Following blocks 810 and 814, the method 800 continues to block 816 and calculates the drive command based on each of the wiper parameters and continues to block 818 which provides the drive command to the motor to mechanically drive the wiper externals. The method continues to entry point "A" of FIG. 7A.

FIG. 8B In the event the method 800 begins at entry point "C" the method continues to decision block 820 to determine the wash control status. If the wash system is ON the method 800 proceeds to block 804 of FIG. 8A, otherwise, the method 800 proceeds to block 814 to stop the spraying the wash fluid to the windscreen and continues as described. It should be understood the method 700 and 800 are not intended to limit the scope but is provided as an illustration of the operation of the wiper and wash system. Different steps, additional steps, or a different sequence of steps can be implemented into the methods.

Figure 9:
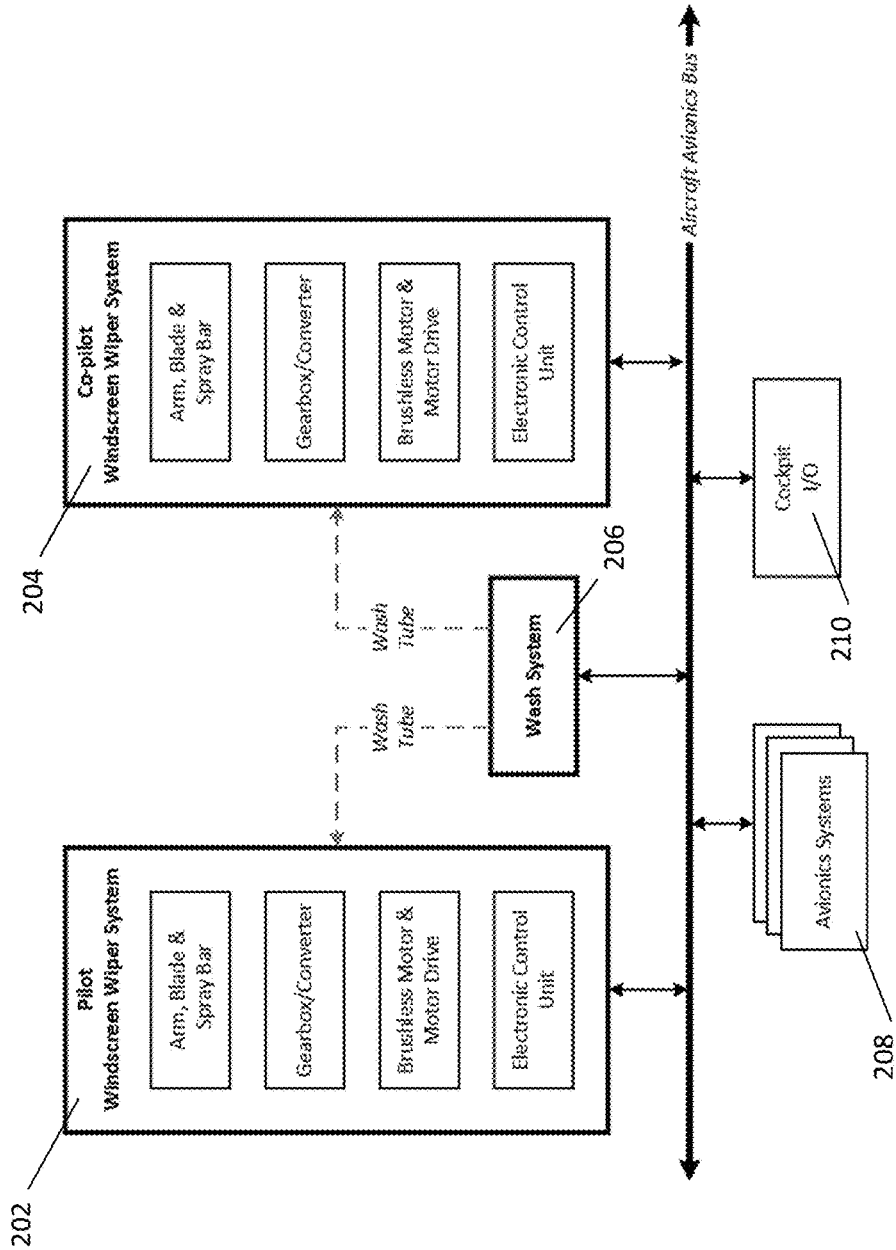
FIG. 9 depicts an architecture that interfaces the wiper system and the wash system directly through the avionics bus.

FIG. 9 depicts an architecture that interfaces the wiper system 202, 204 and the wash system 206 directly through the avionics bus. The architecture shown in FIG. 9 does not include the wash system bus 240 such as that shown in FIG. 2. This architecture reduces the number of connectors required at the wiper systems and wash systems.

Figure 10:
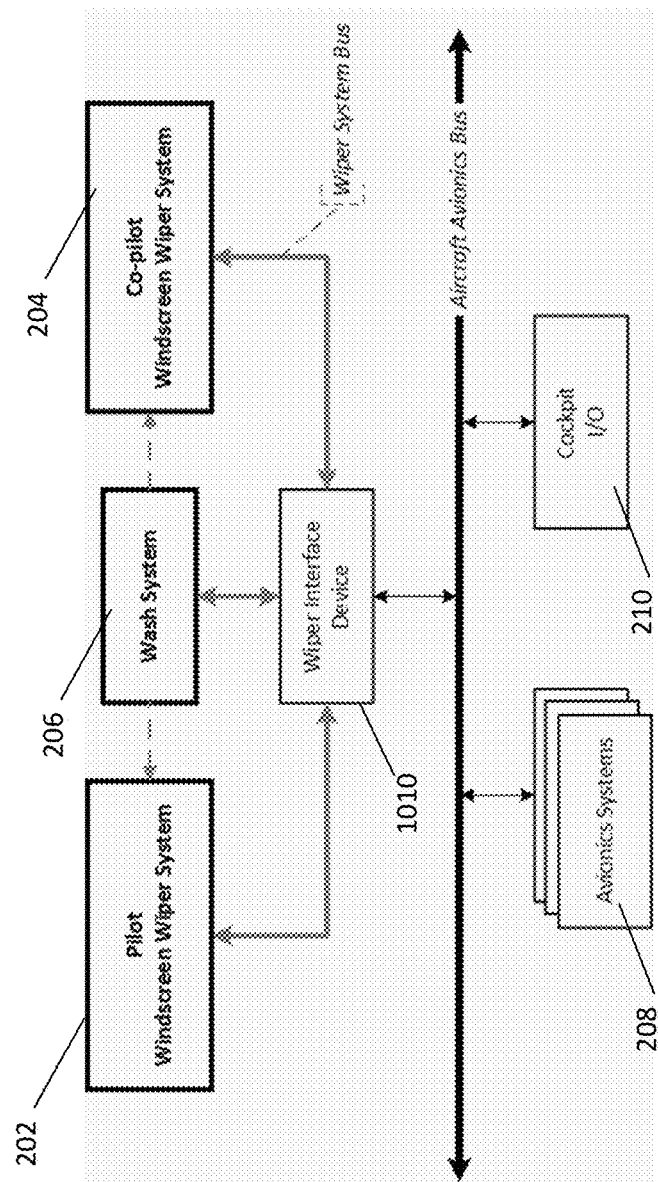
FIG. 10 depicts an architecture that interfaces the wiper system and the wash system through a wiper interface device.

FIG. 10 depicts an architecture that interfaces the wiper system 202, 204 and the wash system 206 through a wiper interface device 1010. The architecture shown in FIG. 10 includes a wiper interface device 1010 which couples the wiper systems and the wash system to the aircraft avionics bus. The wiper interface device 1010 allows for efficient connectivity to the avionics bus by eliminating multiple interface points on the avionics bus. The wiper interface device also abstracts the wiper system and the wash system from the other avionics systems.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    an avionics system configured to dynamically communicate one or more configurable parameters of a wiper and wash system based at least in part on a selected mode;
    an avionics bus configured to communicate dynamic parameters from the avionics system;
    a wash system comprising a fluid reservoir and fluid level sensor; and
    a wiper system comprising a control unit (ECU) configured to operate the system based at least in part on the one or more configurable parameters, wherein the wiper system is coupled to the wash system and supplies the wash fluid to the wiper system.

2. The system of claim 1, wherein the one or more configurable parameters comprises a wiper speed, a sweep angle, and a sweep area.

3. The system of claim 1, further comprising a wiper system bus having an electrical bus that couples the wash system to the wiper system and a wash tube to supply the wash fluid to the wiper system.

4. The system of claim 3, further comprising a wiper interface device configured to interface the wiper system and the wash system coupled to the wiper system bus with the avionics bus.

5. The system of claim 1, wherein the wash system and the wiper system are directly connected to the avionics bus.

6. The system of claim 1, wherein the wiper system includes a first wiper system having a first ECU and a second wiper system having a second ECU, wherein the first and second wiper system are configured to monitor the avionics bus for the dynamic parameters and control the wiper system based on the parameters.

7. The system of claim 6, wherein the first ECU and the second ECU are configured to communicate to synchronize the operation of the first wiper system and the second wiper system.

8. The system of claim 1, wherein selected mode includes an automatic mode which operates the wiper system and wash system based at least in part on an avionics input.

9. The system of claim 8, wherein the avionics input parameters include at least one of air speed of a vehicle or an angle of attack, wherein the avionics system comprises one or more sensors to obtain the avionics input.

* * * * *